May 4, 1943.  G. LEISCHNER  2,318,503
ELECTRIC CONVERTER
Filed Aug. 3, 1940     3 Sheets-Sheet 1

Inventor,
G. Leischner
By: Glascock Downing & Seebold
Attys.

May 4, 1943.　　　G. LEISCHNER　　　2,318,503
ELECTRIC CONVERTER
Filed Aug. 3, 1940　　　3 Sheets-Sheet 2
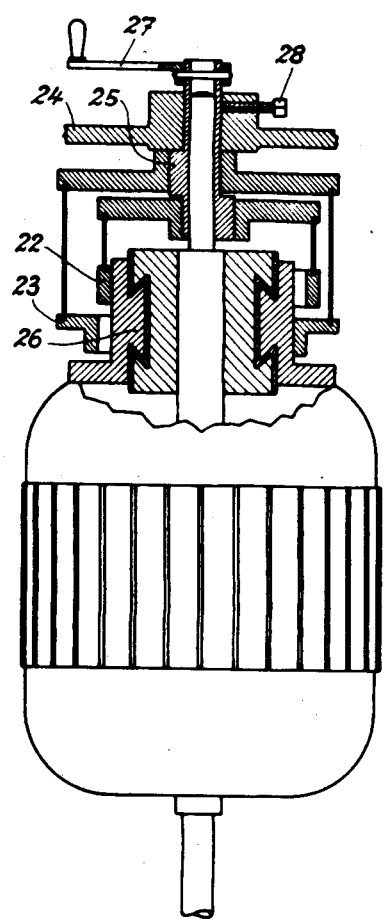
Fig. 4.
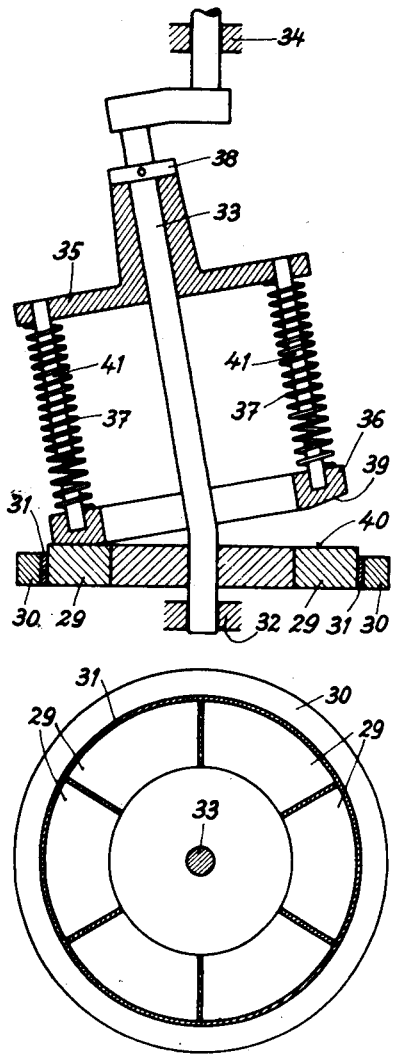
Fig. 5.
Fig. 6.
Inventor,
G. Leischner
By: Glascock Downing Seebold
Attys May 4, 1943. G. LEISCHNER 2,318,503
ELECTRIC CONVERTER
Filed Aug. 3, 1940 3 Sheets-Sheet 3
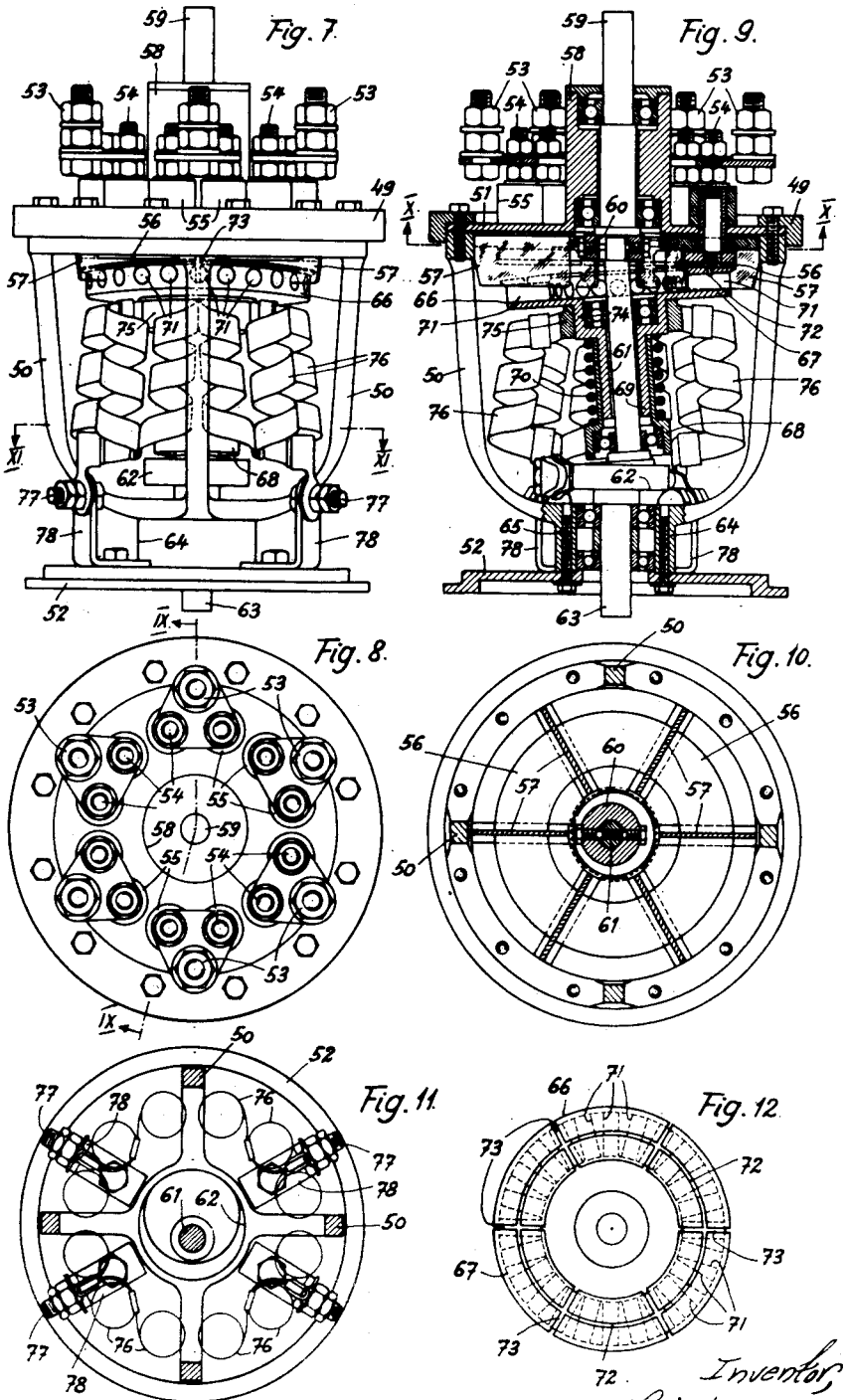
Inventor
G. Leischner
By: Glascock Downing & Seebold
Attys.

Patented May 4, 1943

2,318,503

UNITED STATES PATENT OFFICE 2,318,503

ELECTRIC CONVERTER

Georg Leischner, Bonigen, near Interlaken, Switzerland

Application August 3, 1940, Serial No. 350,759
In Switzerland August 30, 1939

4 Claims. (Cl. 175—364)

The object of the present invention is an electric converter. Up to date, the current collectors in converters were formed as brushes, which, owing to the rubbing contact making, resulted in a great wear and tear of the brushes and the segment members (anodes). Larger dimensions of the brushes are inconvenient for constructional reasons; therefore, the cooling surface is but small, the more so as the carbon brushes are not accessible to the ambient air over their whole surface, the hind-portion being held in a brush holder. For this reason it was hitherto impossible to exceed a current density of 10 amperes per square centimeter, which fact in the case of high currents, resulted in uneconomical dimensions.

As to the reversal of current in rectifiers the brush should make contact on the place where the voltage curves of two adjacent anodes intersect each other, in order to avoid a short-circuit of two different voltages under the brush, i. e., current collector and commutator ought to make contact with each other along a line. This, however, is practically impossible, because the brush has always not only a contact line but a contact surface short-circuiting two different phase voltages of adjacent anodes before and after the intersecting point of the voltage curves. This results in short-circuit currents which may amount to very considerable values. Constructional precautions have already been taken to prevent these short-circuit currents, viz:—A gap with a width equal to that of the brush was provided between two adjacent segments of the commutator so that it was impossible to short-circuit two segments. This construction had the disadvantage that the edges of the segments and the brushes burnt away very rapidly; interruptions of current took place and the converter, after a short time, became unserviceable.

In the converter according to the invention the brushes are replaced by at least one current collector with a circular contact surface, which rolls on the segment member synchronously to the angular velocity of the alternating current to be rectified, making contact with this segment member without slipping.

The wear of the current collector and the commutator is practically avoided. A further advantage of the circular form of the contact surface of the current collector, which may, for instance, be formed as a ring or a disc, is the very great area of the heat eliminating section in comparison to that of the well-known brushes. Added to this the air has free access to the surface of the current collector and this surface may be enlarged at will by attaching radiator fins or lugs to it. This allows a very great density of current to be admitted which results in an increase of the efficiency of the machine. Tests have been made, in which a density of current of about 25,000 amperes per square centimeter contact surface of the current collector has been attained without any disturbance. Besides this, the reversal of current takes place under favourable conditions, because the current collector makes contact with the commutator along lines or at least along narrow surface elements. In this way short-circuit currents, caused by the short-circuiting of different phase voltages of adjacent anodes before and after the point of intersection of the voltage curves are avoided.

The drawings represent, as an example, some embodiments of the converter.

Fig. 4 shows, partly in section, the armature of a bipolar direct-current machine with two annular current collectors.

Fig. 5 is a section of a current collector formed as a tumbling member.

Fig. 6 is a top view of the segment member according to Fig. 5.

Fig. 7 is a side view of an embodiment in which the current collector comprises two portions telescopically fitted into each other.

Fig. 8 is a top view of the apparatus according to Fig. 7.

Fig. 9 is a section taken on line II—II of Fig. 8;

Fig. 10 is a section taken on line IV—IV of Fig. 9;

Fig. 11 is a section taken on line V—V of Fig. 7.

Fig. 12 is a top view of the current collector.

Figure 1:
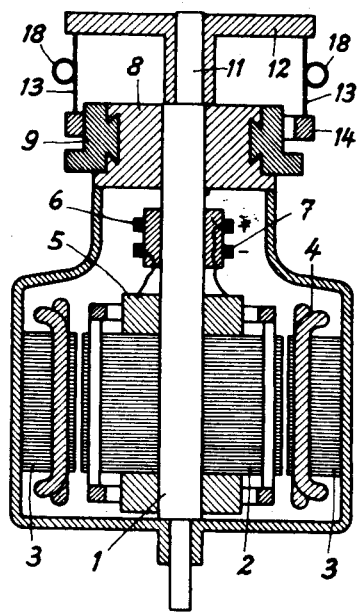
Fig. 1 is a section of a direct-current and alternating-current converter with a synchronous motor.
Figure 2:
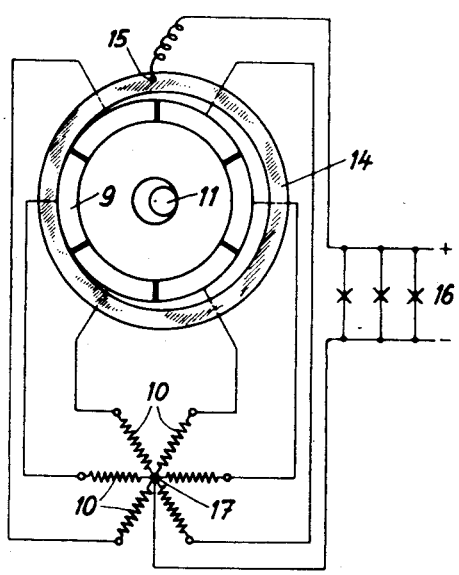
Fig. 2 is a diagram of connections for the embodiments shown in Fig. 1.

Fig. 1 illustrates a synchronous motor of known structure comprising a rotor 2 mounted on the shaft 1, a stator 3, a three-phase winding 4, an exciting winding 5 and positive and negative slip-rings 6, 7 respectively. To the stationary core 8 the anodes 9 of the rectifier are fixed, which anodes, together with this core, form the disc-shaped segment member or commutator with an outer contact surface. The anodes are, in a well-known manner, connected with the six terminals of the six-phase secondary winding 10 of the rectifier-transformer, as is shown in Fig. 2. On the eccentric end 11 of the rotor-shaft 1, named only "eccentric" in the following description, the cathode is loosely mounted. This latter comprises a carrier 12 and an annular current collector 14 surrounding the segment member. This current collector 14 is flexibly connected with the carrier 12 by means of bars 13 lying on the envelope of an imaginary cylinder. The current is led away from the current collector at 15 and is led into the supply-circuit 16, which, on the other side, is connected to the neutral point 17 of the secondary winding 10 of the transformer. The bars 13 are formed as springs with a turn 18 and ensure a uniform contact pressure between the anodes 9 and the current collector 14. The motor being in action, the cathode on the eccentric 11 moves in such a way, that each imaginary generating line on the contact surface of the current collector radially approaches the commutator and, the contact having been made, then removes itself radially. In this way any slipping of the current collector on the commutator is avoided.

Figure 3:
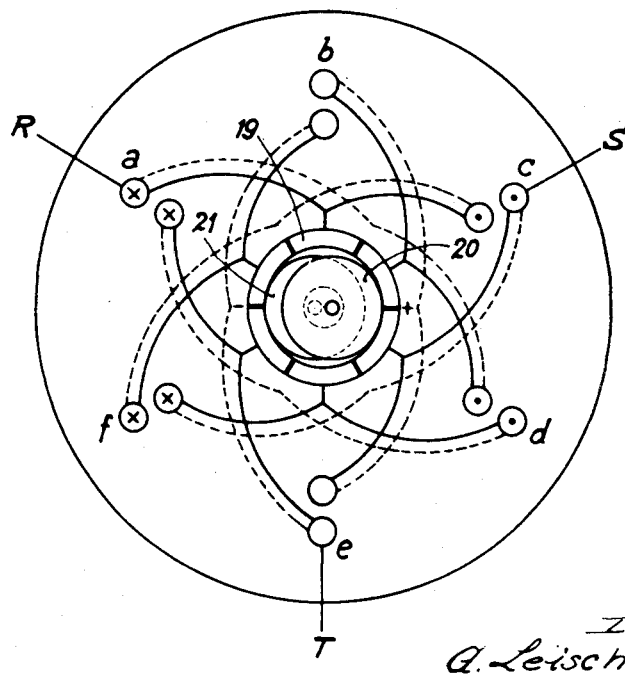
Fig. 3 shows schematically a converter with a normal bipolar direct-current winding, used as a rotary field transformer and provided with two disc-shaped current-collectors inside an annular collector.

Fig. 3 schematically illustrates a converter of normal structure, provided with a bipolar direct-current winding and used as a rotary field transformer. From each joint of two of the six coils, a, b, c, d, e, f a conductor leads to the corresponding segment of the annular commutator 19 with an inner contact-surface. The two brushes are replaced by two eccentrically mounted disc-shaped current collectors 20, 21 surrounded by the commutator 19. Instead of the current collectors being disc-shaped, they might also be formed as rings.

In this embodiment a slipping of the current collector on the commutator is also avoided by the fact that the current collector radially approaches and removes itself from the commutator.

Fig. 4 represents the armature of a bipolar direct-current machine with two annular current-collectors 22, 23. These latter are loosely mounted on the eccentric bush 25 fixed to the bearing bracket 24 and, owing to friction, are driven by the rotating commutator 26. The two current collectors 22, 23 always make contact with the commutator at the same points diametrically opposite. In order to change the position of the two contact-points with regard to the commutator the eccentric bush 25 can be rotated by means of the handle 27 around the axis of the commutator. The adjusting screw 28 prevents the bush from being rotated during operation.

In order to eliminate the unsymmetry of the centrifugal forces caused by the eccentricity of the current collector, the equilibrium of the rotating parts is restored by providing counterbalance weights on the eccentric shaft.

Fig. 5 represents a further embodiment of the current collector formed as a tumbling disc, whose end face is adapted to make contact with the segment member or commutator. This latter is of a known structure and comprises the anodes 20, the steel ring 30 and the insulation 31. The obliquely cranked shaft 33 is placed on bearings 32 and 34 and may, for instance, be coupled with the shaft 1 of the synchronous motor shown in Figure 1. This cranked shaft 33, when rotating, describes the envelope of an imaginary cone with its axis perpendicular to the contact surface 40 of the segment member. The cathode comprising the carrier 35, the current collector 36, the springs 37 connecting carrier and current collector with each other, and the guide pins 41, is loosely mounted on the obliquely cranked shaft by means of the carrier 35. Safety ring 38 prevents the cathode from giving way upwards. The current collector 36 is fixed to the carrier with the aid of the helical springs 37 guided by the pins 41. The contact surface 39 of the current collector is the envelope of a truncated cone, adapted to roll on the end surface 40 of the segment member. On the rotating of the cranked shaft 33 the contact lines (generating lines) of the anode and cathode come into and out of contact with one another in a direction perpendicular to the surface 40, so that a slipping of the contact surfaces on each other is practically avoided.

The converter shown in Figs. 7 to 12 has a frame comprising a cage 50, a plate 51 and a flange 52. Cage and plate are held together by means of a connecting ring 49. Above the plate 51 connecting terminals 53 for the six phases of the current to be converted are provided. They are connected with the ring-segments 56 with the help of the bolts 54 passing through insulating tubes 55. These ring-segments are placed below the plate 51 and are shown specially clear in Fig. 10. They are separated from one another by insulating pieces 57 and form a kind of disc-shaped commutator. These insulating pieces, which are also shown in Figs. 7 and 9, project beyond the ring-segments by some millimeters and thus elongate the leakage path from one segment to the other, so that a potential difference of several thousand volts may exist between adjacent segments.

In the centre of the plate 51 a bearing body 58 is provided, carrying two ball-bearings which support the one portion 59 of the converter-shaft. Inside the cage 50 this portion carries a flange 60, in the interior of which the upper end of the cranked shaft portion 61 is adjustably held by means of screws. This cranked portion 61 is mounted slantwise on a disc 62 provided at the end of the lower shaft-portion 63. This latter is supported by two ball-bearings in the neck 64 of the cage 50. Flange 52 is attached to this neck by means of screws 65.

The current collector 66 is rotatably mounted on the cranked shaft portion 61 by means of ball-bearings. This current collector comprises two parts, viz: the contact disc 67 and the guide-bush 68. The contact disc has an extension tube 69 entering the guide-bush 68, i. e., the two parts of the current collector are telescopically assembled. An initially stressed helical spring 70 mounted between these two parts, tends to remove them from each other.

The contact disc has lateral ventilating holes 71 communicating with a slit 72 (Fig. 12) arranged concentrically to the axis of the current collector. The contact surface of the contact-disc is subdivided into six parts by narrow radial gaps 73, corresponding to the ring-segments 56 of the commutator. These gaps 73 are so deep and so shaped that the insulating pieces 57 can enter them. When the converter is working the mutual position of the commutator, formed by the ring segments and the insulating pieces, and the contact disc, subdivided by the gaps, cannot change. There are always the same parts which make contact with one another.

To the shoulder 74 of the contact ring a ring

75 is shrunk-on, to which flexible conductors, formed as metal band springs, are attached. These springs are connected to the current terminals 77 on insulated angle pieces 78, these terminals, in operation, are connected in parallel.

The embodiments represented serve the sole purpose of showing the nature of the converter according to the invention. The invention is not limited to these embodiments but may be used anywhere where converters are necessary, that is, in electric machines of all types and for all kinds of current, e. g., in auxiliary machines, phase advancers, frequency changers in all alternating-current converters with transformers for converting direct current into alternating current and three-phase current, in converters for the connection of networks and for the recovery of energy, for instance in electric railways, in control devices of signalling and advertising plants of all kinds and for flash-light plants. The converter according to the invention may, for instance, also be used in machines of known types with two and more commutators.

The whole converter with its contact device might be immersed in a special medium, such as a gas (rare gas), a liquid (e. g. transformer oil) or may be located in a vacuum. Preferably the commutator and the current collector are made of different materials, e. g. the one of copper and the other of silver; or the one of chrome, the other of cadmium, etc.

It is clear that it is unessential whether the current collector or the commutator be movable, the relative motion between these two members only is of importance. Instead of the current collector, the commutator or both might be flexibly mounted.

What I claim is:

1. In an electric commutator, a segment member, a rotatable shaft, a current collector loosely and eccentrically mounted on said shaft and always in contact with said segment member at one point, said current collector having gaps subdividing the latter, insulating pieces adapted to subdivide said segment member and to enter said gaps, said shaft on rotating providing relative movement between said segment member and said current collector.

2. In an electric commutator, a segment member, an obliquely cranked rotatable shaft, a tumbling member loosely mounted on said cranked shaft and always in contact with said segment member at one point, said tumbling member having gaps subdividing the latter, insulating pieces adapted to subdivide said segment member and to enter said gaps, said cranked shaft on rotating providing relative movement between said segment member and said tumbling member.

3. In an electric commutator, a segment member, an obliquely cranked rotatable shaft, a tumbling member loosely mounted on said cranked shaft comprising two telescopically assembled portions and a spring tending to remove these portions from each other, one of said portions being formed as a contact portion comprising lateral ventilating holes and being always in contact with said segment member at one point, said cranked shaft on rotating causing relative movement between said segment member and said contact portion.

4. In an electric commutator, a segment member, an obliquely cranked rotatable shaft, a tumbling member loosely mounted on said cranked shaft comprising two telescopically assembled portions and a spring tending to remove said portions from each other, one of said portions being formed as a contact portion always in contact with said segment member at one point, and said contact portion including ventilating holes and a slit communicating with said ventilating holes.

GEORG LEISCHNER.